US010759361B2

(12) United States Patent
Schwimmbeck et al.

(10) Patent No.: US 10,759,361 B2
(45) Date of Patent: Sep. 1, 2020

(54) GROMMET AND METHOD FOR PRODUCING A GROMMET

(71) Applicant: Lisa Draexlmaier GmbH, Vilsbiburg (DE)

(72) Inventors: Johann Schwimmbeck, Falkenberg (DE); Christian Binder, Gangkofen (DE); Klaus Beinhundner, Neukirchen (AT); Robert Radu, Hunedoara (RO); Silviu Cocis, Hunedoara (RO); Enikoe Szabo, Braunau/Inn (AT); Benedikt Müller, Tann (DE)

(73) Assignee: LISA DRAEXLMAIER GmbH, Vilsbiburg (DE)

(*) Notice: Subject to any disclaimer, the term of this patent is extended or adjusted under 35 U.S.C. 154(b) by 284 days.

(21) Appl. No.: 15/769,737

(22) PCT Filed: Oct. 19, 2016

(86) PCT No.: PCT/EP2016/075088
§ 371 (c)(1),
(2) Date: Apr. 19, 2018

(87) PCT Pub. No.: WO2017/067981
PCT Pub. Date: Apr. 27, 2017

(65) Prior Publication Data
US 2018/0297542 A1 Oct. 18, 2018

(30) Foreign Application Priority Data
Nov. 19, 2015 (DE) .......................... 10 2015 220 318

(51) Int. Cl.
B60R 16/02 (2006.01)
F16L 5/02 (2006.01)
(Continued)

(52) U.S. Cl.
CPC ............ *B60R 16/0222* (2013.01); *F16L 5/02* (2013.01); *H02G 1/14* (2013.01); *H02G 3/22* (2013.01)

(58) Field of Classification Search
CPC .......... B60R 16/0222; H02G 3/22; F16L 5/02
(Continued)

(56) References Cited

U.S. PATENT DOCUMENTS 5,087,153 A * 2/1992 Washburn ............ G02B 6/4459
138/108
5,545,854 A 8/1996 Ishiba
(Continued)

FOREIGN PATENT DOCUMENTS

CN 1691424 2/2005
CN 101068072 11/2007
(Continued)

OTHER PUBLICATIONS

Machine Translation of JP2006006359.
(Continued)

Primary Examiner — Dimary S Lopez Cruz
(74) Attorney, Agent, or Firm — Jacob Eisenberg

(57) ABSTRACT

The present disclosure relates to a grommet for guiding one or more cables through an opening in a component. The grommet has a first shell element made of a first form-stable plastic and at least partly surrounding the outer circumference of the cable. The grommet also has a second shell element joined to the first shell element and at least partly surrounding the outer circumference of the cable and defining together with the first shell element a guide channel sealed in the circumferential direction of the cable, to guide the cable through the opening in the component. A sealant consisting of a foamed second plastic is introduced into the guide channel to longitudinally seal the grommet against (Continued)

water. The present disclosure also relates to a method for producing such a grommet.

19 Claims, 4 Drawing Sheets

(51) Int. Cl.
*H02G 3/22* (2006.01)
*H02G 1/14* (2006.01)

(58) Field of Classification Search
USPC .................. 174/153 G, 156, 656, 152 G
See application file for complete search history.

(56) References Cited

U.S. PATENT DOCUMENTS

| | | | |
|---|---|---|---|
| 6,218,625 | B1 | 4/2001 | Pulaski |
| 2008/0017401 | A1* | 1/2008 | Uchida ............... B60R 16/0222 174/153 G |
| 2014/0054064 | A1* | 2/2014 | Gronowicz, Jr. ... B60R 16/0222 174/152 G |

FOREIGN PATENT DOCUMENTS

| | | |
|---|---|---|
| CN | 201327987 Y | 10/2009 |
| CN | 101960686 A | 1/2011 |
| CN | 202074132 U | 12/2011 |
| CN | 103928901 A | 7/2014 |
| CN | 103079893 A | 2/2016 |
| DE | 37 40 582 A1 | 6/1989 |
| DE | 297 21 749 U1 | 2/1998 |
| DE | 69501611 T2 | 10/1998 |
| DE | 10240864 A1 | 3/2004 |
| DE | 10 2004 023 334 A1 | 12/2005 |
| DE | 10 2005 022 937 A1 | 11/2006 |
| DE | 10 2006 049 689 B3 | 2/2008 |
| DE | 102006039648 | 3/2008 |
| DE | 10 2010 039 225 A1 | 3/2011 |
| DE | 10 2010 028 592 A1 | 11/2011 |
| EP | 0706915 A1 * | 4/1996 ......... B60R 16/0222 |
| EP | 0 731 000 B1 | 6/2001 |
| FR | 2406903 A1 | 5/1979 |
| JP | 2005006350 | 1/2005 |

OTHER PUBLICATIONS

Machine Translation of CN1691424.
Machine Translation of CN101068072.
Machine Translation of DE102006039648.
Machine Translation of CN201327987Y.
Machine Translation of CN101960686A.
Machine Translation of CN202074132U.
Machine Translation of CN 103079893A.
Machine Translation of CN103928901A.
German Office Action dated Jul. 28, 2016, issued in German Application No. 10 2015 220 318 2 (10 pages).
International Search Report and Written Opinion dated Dec. 5, 2016, issued in PCT Application No. PCT/EP2016/075088 (14 pages).

* cited by examiner

GROMMET AND METHOD FOR PRODUCING A GROMMET

CROSS-REFERENCE TO RELATED APPLICATION

This is a National Phase Application which claims benefit to PCT Application No. PCT/EP2016/075088, filed Oct. 19, 2016, published as WO 2017/067981 A1, and which claims benefit of German Application No. 10 2015 220 318.2, filed Oct. 19, 2015, all of which are incorporated herein by reference.

TECHNICAL FIELD

The present invention relates to a grommet for guiding at least one cable or a cable set, particularly pneumatic, hydraulic, optical or electric lines, through an opening in a component. The invention also relates to a method for producing this type of grommet. The grommet is particularly well suited for use in a vehicle such as a motor vehicle, hybrid or electric vehicle.

BACKGROUND OF THE INVENTION

For example, various designs of grommets for guiding cables or entire cable sets through an opening in a component are known in automotive engineering. This type of grommet is usually already attached to the cables and cable sets as part of the assembly process during manufacture of a cable set for a vehicle. For practical purposes this is done only after the cables have been cut to size and stripped of insulation, plug connectors have been attached and the cables or sets of cables have been bundled together. Cables or cable sets assembled in this way are then delivered to the vehicle manufacturers for installation in the vehicle with the grommet already attached. Here the grommet is arranged on the opening in the component of the vehicle, for instance to guide the cable or cable set from the engine compartment of a vehicle through the opening in the component, in this case a splash panel, and on into the vehicle interior. However, the component opening may also be situated in the frame of a vehicle door or any other part of the vehicle.

A grommet of this type is known from DE 10 2010 028 592 A1, for example. The grommet described therein is molded from two different foamed plastics. A first foamed plastic surrounds the cable and is connected in a material bond to a flange-like fastening body for attachment to an opening in a component. An additional foamed sealing body is provided as a seal for the component opening. Although this grommet allows a tight seal between the cable and the component opening, it has been shown that the production effort and expense involved are relatively high due to the structural design and the quantity of foamed plastic used.

Another grommet is described in DE 10 2010 039 225 A1. This grommet consists of foamed plastic as the sealing inner part, and a flange-like frame made of a different plastic and provided for attachment to a component opening. A disadvantage of this is that the production of the grommet is complicated due to the structural design and the quantity of foamed plastic used.

What the grommets known in the state of the art have in common is that they are manufactured mainly of foamed plastics with the aid of foam-molding tools. For this purpose the cables or cable sets are transported first to the foam-molding tool, inserted manually into the tool and removed, again manually, after the foamed plastic has cured. Here there is a risk of damage, for instance by crushing, to an already finished cable set as it is being transported to the foam-molding tool or during foaming, insertion or removal. As a consequence of this type of damage, the assembled cable set is rejected. Depending on the customer's wishes, the electrical functionality of the cable set is tested either before or after the foam molding of the grommet. In the case of testing before foam molding it is possible that damage to the cable set during the foam molding procedure would go unnoticed, at least up until delivery. In the case of testing after foaming it is possible that an additional test has been conducted before the rejection. On the whole, foam molding of the grommet involves risks. In addition, placing the cable or cable set into the foam-molding tool, curing the foamed plastic and subsequently removing the cable or cable set involves a comparatively long process time, frequently amounting to seven minutes or more. Furthermore, foam molding of plastics is expensive due to the large volume of foam required, since the purchase price of foamed plastic is comparatively high.

Moreover, in DE 37 40 582 A1, DE 10 2005 022 937 B4 and EP 0 731 000 B1, for example, grommets are known that have to be threaded onto the assembled cable set, which could lead to rejection due to damage occurring in the process.

In DE 297 21 749 U1 and U.S. Pat. No. 5,545,854 A, two-part grommets are known that are pressed onto the cable set from a lateral direction, so that threading them on becomes unnecessary. A disadvantage of this is that the force required to press on the grommet can also crush the cables. In addition, a tool is usually necessary to press on the grommet with the required amount of force.

DESCRIPTION OF THE INVENTION

Therefore, it is an object of the invention to use the simplest possible constructional means to create a time-saving and/or cost-effective possibility for guiding a cable through an opening in a component.

The object is achieved by the subject matters of the independent claims. Advantageous further developments of the invention are specified in the dependent claims, the description and the accompanying drawings.

A grommet according to the invention, for guiding at least one cable, several cables or a cable set through an opening in a component, comprises a first shell element that at least partly surrounds the outer circumference of the cable and is made of a first form-stable plastic. The grommet also comprises a second shell element joined together with the first shell element and at least partly surrounding the outer circumference of the cable. The first shell element and the second shell element together define a guide channel that is largely sealed against fluid in the circumferential direction, for passage of the cable through the opening in a component. The second shell element may also be made of the first plastic. A sealant to seal the grommet longitudinally against water is introduced into the guide channel, which at the same time forms a hollow space with a fillable volume surrounding the cable.

In other words, the grommet according to the invention is in two parts and essentially comprises the two shell elements, which at the same time form a type of foam-molding tool for the sealant being introduced, and the sealant, which serves primarily as a longitudinal seal against water and which is introduced into the guide channel formed by the shell elements. The shell elements here may have one or more bends in the longitudinal direction of the cable; they may also bend around several bending axes. The guide channel thus defines the installation path of the cable through the opening in the component and, where applicable, away from the same.

Also, the inner volume of the guide channel determines the fillable volume for the longitudinal water sealant. The guide channel preferably has a cross-section that is only slightly larger than that of a bundle of cables laid in the guide channel. Only a small volume of sealant is required for this. The sealant may be an initially fluid or viscous sealant that cures later.

In order for the shell elements of the grommet to be used concurrently as a foam-molding tool for the sealant to create a longitudinal seal against water, at least one of the shell elements has a filler pipe for introducing the sealant, that is connected to the guide channel by molding or casting. In the simplest case, this can be a through-hole connecting the shell's exterior with its interior. Ideally, the through-hole has an outer geometry resembling that of a connecting pipe, thereby allowing a foam-molding installation to be connected to it as tightly as possible. Since the sealant preferably cures with time, within two to five minutes, depending on the quantity of sealant, the cured sealant closes the through-hole so that no separate seal for the through-hole is required. This makes it possible to do without separate foam-molding tools, since the grommet itself already assumes the function of a foam-molding tool.

For an especially reliable seal of the cable or cable set against the intrusion of water longitudinally, the sealant is a second, foamed plastic that differs from the plastic of the shell element. This second plastic, for example, may be a foamed polyurethane (PUR), which has already proved itself in conventional grommets. This plastic spreads well between the individual cables prior to curing and fills the volume of the guide channel during the curing process. The second plastic is retained in the guide channel by the shell elements of the grommet before the curing, where it can cure independently of separate foam-molding tools or independently of the position of the cable or cable set.

The second plastic introduced into the guide channel thus has a lower mechanical rigidity and form stability than the first plastic used for the shell elements. This means that the plastic used in the area of the opening in the component is stiffer and more form-stable than the plastic used to longitudinally seal the cable or cable set.

Thus, the invention offers a time-saving and/or cost-effective possibility for guiding one or more cables through an opening in a component. Because the shell elements are permanently mounted around the cable, no separate foam-molding tool is required for the longitudinal water sealant, as it is already integrated into the grommet and hence it is a component part of the grommet. This eliminates the need for transporting and inserting the cables into a foam-molding tool, and thus the risk of damage to the cables is reduced to a minimum. The sealant can already be introduced on a construction board used to produce the cable. Since the shell elements are constituent parts of the grommet and therefore remain on the cable, the sealant can cure or post-cure after the cable is removed from the construction board, a foaming site etc., which reduces the process time as a whole. Because the sealant serves primarily for longitudinal sealing against water, only a small amount of sealant is necessary, and it cures relatively quickly. Tests have yielded measured process times of approximately two minutes. The (hard-)shell elements of the comparatively stiff and form-stable first plastic also have the effect of having a mechanically sturdier and more form-stable sealing function with regard to the component opening than compared to purely foam-molded grommets. In addition, it has been shown that the first plastic used for the shell elements is less expensive than a foamed plastic. In the installed state the shell elements also give rise to a higher degree of dimensional accuracy than purely foamed grommets.

The shell elements, which also serve as the foam-molding tool, advantageously remain securely connected to the cured sealant, for instance by an undercut. They provide robust protection for the grommet throughout the assembly and the life cycle of the cable set.

The functionality of the cable set can be advantageously tested without problems, for instance with a continuity test, either before or after the sealant is introduced. This is because the risk of damage during the introduction of the sealant is minimized by the invention. Thus, it is possible for the shell element first of all to be attached to the cable or cable set, after which a test is conducted, a defect detected during the test is corrected and only then is the sealant introduced.

An especially advantageous further development of the invention provides that the first plastic is an injection-molded thermoplastic material such as polypropylene (PP), polyamide (PA), polycarbonate (PC), polymethyl methacrylate (PMMA) or the like. Thus, the first shell element and the second shell element, which where applicable is made of the same plastic as the first shell element, can be produced in large quantities, with short process times and at low cost by using a reusable injection-molding tool. For practical purposes, the injection-molding tool for each shell element comprises two tool halves made of metal.

In order for the grommet to also be produced on a construction board used to produce the cable sets, it has proved to be advantageous if the first and second shell elements are each molded as half-shells. They may be symmetrically or asymmetrically divided. In this way the shell elements may be placed around the cable from the side, namely in a circumferential direction, and joined together. This means that it is not necessary to push or slip the grommet on in the longitudinal direction of the cable or of the cable set.

To make mounting the grommet to the cable or cable set particularly easy, it is advantageous if the first and second shell elements are joined together in such a way that their joint edges extended essentially parallel to the cable guided in the guide channel. In this way the shell elements, which where applicable are designed as half-shells, can simply be placed laterally around the cable or the cable set and joined together. The joint edges overlap, for example by a few millimeters, preferably in the radial direction of the shell elements. The shell elements are so firmly joined together by this means that they also withstand a higher inner pressure caused by the sealant introduced into the interior of the joined shell elements. Depending on viscosity and/or the customer's wishes, the joint edges may be sealed by a joint edge seal to prevent the sealant introduced into the guide channel from escaping. For example, the joint edge seal may be integrally formed with one or both shell elements in a multi-component injection-molding process. However, the joint edge seal may also be separate from the shell elements and attached to them.

For easy attachment of the shell elements it is advantageous if the first shell element and the second shell element are joined together by one or more latch connections. This means that the shell elements are connected to each other with an interlock connection. For example, the latch connection may be in the form of a clip-on connection.

In an easily assembled further development of the invention a latch connection serving to join the shell elements together is formed by a plurality of latch elements of the one shell element and, interacting therewith, a plurality of mating latch elements of the other shell element. These latch elements interlock with the mating latch elements essentially in the circumferential direction of the cable. The latch elements and the mating latch elements are preferably formed directly, that is integrally with the shell elements, during the injection molding of the shell elements. The latch connection is structurally designed in such a way that it withstands the inner pressure exerted by the injected sealant.

It has proved to be advantageous for the distribution of the sealant within the guide channel if every shell element has on its inner side a plurality of ridges protruding from an inner wall; when the shell elements are fitted together the ridges complement each other to form a spiral. This means that the ridges along the cable set are spiral shaped and by protruding from the inner wall of the guide channel they come into direct contact with the cable set. Thus, the ridges also serve as spacers between the inner wall and the cable set, with the result that the sealant can be conveyed between the ridges. In other words, the sealant can spread out between the ridges and thus be distributed along the guide channel. In this way the longitudinal sealing against water is again improved. The filling of the guide channel with the sealant is directed by the ridges, with the result that the sealant may form a continuous spiral of foam.

To contain the sealant in the guide channel with minimal escape or none at all, it has proved to be advantageous if at least two sealing elements that overlap in the circumferential direction of the guide channel and are held together with a tie element such as a cable binder or the like are arranged at least on one longitudinal end of the joined-together first and second shell elements, thereby sealing the guide channel against an escape of sealant. This sealing element, for example, may be made of a thermoplastic elastomer (TPE) or any other suitable, preferably elastic (synthetic) material. The sealing element is preferably integral with the shell elements; this can be accomplished using a multi-component injection-molding process, for example. Here, for example, a sealing element is arranged on every shell element and the sealing elements overlap when the shell elements are joined together. Ideally, the sealing elements are adapted to project beyond the free end of the shell elements, for instance by approximately 5 mm to 50 mm, preferably approximately 25 mm to 35 mm, ideally by approximately 30 mm. As an alternative, the sealing element may also be designed as a sealing hoop, a sealing strip, an applied sealing putty or the like. For the assembly a sealing strip may be placed into or adhered onto every shell element, with the two sealing strips mutually overlapping and lying on the outer circumference of the cable when the shell elements are joined together. In this manner, the guide channel may be sealed in the longitudinal direction of the cable, so that the sealant introduced into it cannot escape prior to curing.

The sealing element is advantageously made of a third plastic that is different from the first plastic and/or from the sealant. For example, thermoplastic elastomers (TPE) have proved themselves for this purpose. By using two or three different materials for the various tasks of the grommet, the most cost-effective combination of materials may be selected in each case.

In order to use as few individual elements as possible to assemble the grommet, it is advantageous for the first and/or second shell elements to have a molded-on or cast-on flange to seal the opening in the component. This means that the flange on the shell elements is an integral part of the grommet, so that no additional connection of the grommet in a material fit, a friction fit or a positive fit is necessary.

To achieve easy assembly and good sealing capability at the same time, it is advantageous for the flange to be circular, extending radially away from the cable it surrounds. Ideally, the component opening that it is to be closed is likewise circular.

To obtain simple and time-saving assembly capabilities of the cable or cable set together with the grommet at the vehicle manufacturers, the flange may have one or more bayonet-like fitting elements to be attached to the component opening. In this way the cable or cable set can be easily guided through the opening in the component and the flange can be brought into abutment with the opening. With a simple turning motion the one or more bayonet-like fitting elements can be connected to a corresponding bayonet-like fitting element of the component having the opening. As an alternative to the bayonet fitting, the flange may also be radially larger and have through-holes for a screwed connection to the vehicle-side component opening.

To permit one or more cables to be guided subsequently through the component opening, at least one shell element may have a through-bore extending adjacent to the guide channel. This may be useful if a vehicle component such as an auxiliary heater, trailer hitch, etc., is installed at a later date.

The invention also relates to a method for producing a grommet suitable for guiding one or more cables or cable sets through an opening in a component. The method is particularly well suited for producing a grommet in one or more of the variants of embodiments explained above. The method includes at least the following steps:

The cable or cable set is readied for use. The most practical way to do this is for the cable or the cable set to remain on a construction board commonly used for this purpose after it has been cut to size, stripped of insulation, attached to electrical contacting parts, etc. This means that the cable or cable set is not transported to a foam-molding or other, similar tool.

A form-stable first shell element and a form-stable second shell element to be joined together with the first one are arranged around an outer circumference of the cable. The shell elements for this may be designed as symmetrically or asymmetrically divided half-shells that are placed on the cable or the cable set from the side, where they are joined together, for instance by latching.

After the shell elements have been placed and joined together, a foamed sealant is introduced into a guide channel that is defined by the shell elements and is closed in the circumferential direction of the cable in order to seal the grommet longitudinally against water. This means that the shell elements, which constitute an integral part of the grommet, are used concurrently as molding or foaming tools for the sealant used to seal longitudinally against water.

The shell elements continue to be used as components of the grommet. In other words, the shell elements are left on the cable, namely preferably beyond a curing time of the sealant. This means that the shell elements are not removed again after introduction of the sealant, as is the case in a foam-molding tool of a conventional grommet, but rather they remain on the cable or the cable set and continue to define the layout of the cable through the opening in the component. Where applicable, they have a flange for sealing purposes.

To make it possible to use the shell elements concurrently as a foam-molding tool, the sealant is introduced via a filler pipe that is molded or cast onto one or more of the shell elements. For example, a hose or nozzle of a foaming installation containing the sealant is guided up to the shell element and the sealant is filled directly into the guide channel. The sealant, which cures with time, plugs up the spout, thereby eliminating the need for additional sealing.

For process times that are as short as possible and to achieve a simple structure of a production site, it is advantageous for the sealant to be introduced through a foaming installation, while the one or more cables is or are arranged on a construction board used for its/their production. For example, the foaming installation may be arranged partly above the construction board and guided from there to the filler pipe. As an alternative, the sealant may also be introduced at a test stand or a foaming place set up for this purpose.

BRIEF DESCRIPTION OF THE DRAWINGS

An advantageous embodiment of the invention is explained below with reference to the accompanying drawings. In the drawings:

The drawings are merely schematic representations and serve only to explain the invention. The same or similar elements are provided throughout with the same reference numbers.

FIG. 1 shows a grommet 1 according to the invention, with a schematically suggested electric cable set 2 that is guided through an opening 3 in the component of a vehicle. The opening 3 in the component is an opening in a chassis part 4 situated between a motor compartment or exterior compartment and the interior of the vehicle. The grommet 1 is provided to allow the cable 2 to be guided through the component opening 3, which is circular in design here, and to close and seal the opening against the intrusion of environmental influences such as water into the interior of the vehicle.

FIG. 1 shows the grommet 1, comprising essentially a first shell element 5 having a second shell element 6 joined to it. The shell elements 5, 6, which are embodied here as symmetrically divided half-shells, are made of a first thermoplastic synthetic material produced using an injection-molding tool (not shown); in other words, it is unfoamed. In the joined state shown here, the shell elements 5, 6 form a guide channel 7 with a circular cross-section adapted to the outer diameter of the cable set 2. The inner diameter of the guide channel 7 is dimensioned to create a hollow space with a defined volume between the cable set 2 guided in the channel and the inner wall of the guide channel 7.

Figure 1:
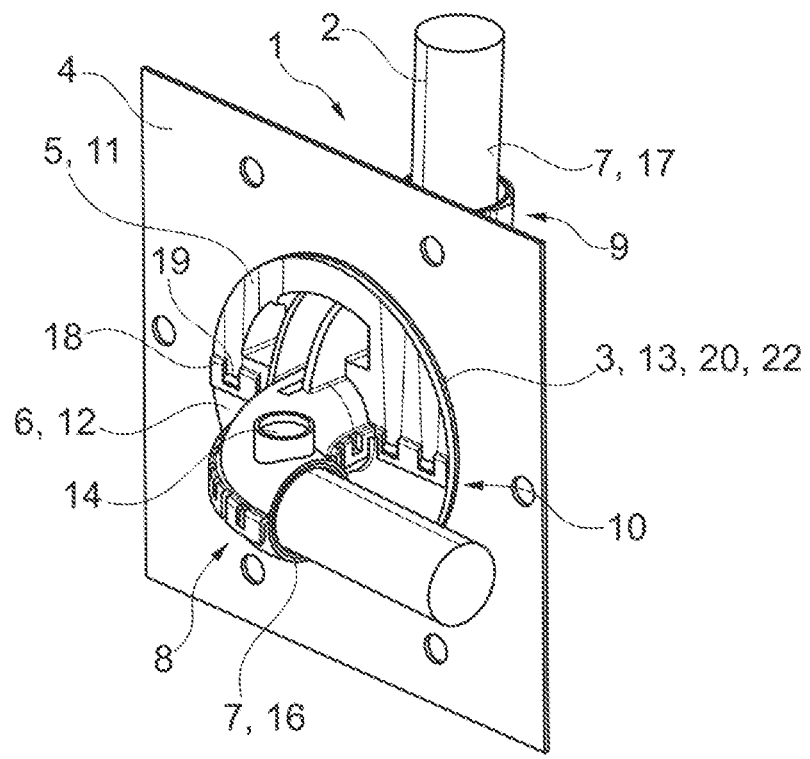
FIG. 1 shows an opening in a component through which a cable set is guided using a grommet according to the invention.

The guide channel 7 can be functionally subdivided into a first guide channel segment 8, situated in front in FIG. 1, and a second guide channel segment 9, situated in the rear in FIG. 1. The guide channel segments 8, 9 define an installation path of the cable set 2 through and beyond the component opening 3. In this embodiment they are bent around different axes in the longitudinal direction of the cable set 2. Whether or not bends are provided here, and if so, how many, depends on the desired cable layout in the vehicle, meaning that the shaping of the shell elements 5, 6 may deviate from that shown here. The bends may be affected by the shape of the injection-molding tool (not shown).

A flange 10 is arranged between the first guide channel segment 8 and the second guide channel segment 9. The flange 10 is comprised of a first flange section 11 of the first shell element 5 and a second flange section 12 of the second shell element 6. The geometric shape and dimensions of the flange 10 are adapted to the component opening 3 to be sealed by it. In the present case it is circular with a radial extension which in the front area of the flange 10 shown in FIG. 1 is slightly larger than the inner diameter of the component opening 3, thereby forming a stop. An annular seal 13 is provided between the front face end of the chassis part 4 as shown in FIG. 1 and the flange 10. It abuts both the flange 10 and the chassis part 4 to seal the component opening 3 against environmental factors.

In addition, FIG. 1 shows that the first shell element 5 has a filler pipe 14 in the area of the first guide channel segment 8 for introduction of a fluidic foamed sealant 15 (see FIG. 3) for longitudinal sealing against water. The sealant 15 here is a second plastic, namely foamed polyurethane (PUR) that differs from the first plastic of the shell elements 5, 6. The filler pipe 14 is designed as a through-hole extending through the shell element wall and opening into the guide channel 7. In this way, the sealant 15 can be introduced from the outside between the shell elements 5, 6 and the cable set 2 guided in the guide channel 7, where it then spreads out. The joined shell elements 5, 6 forming the guide channel 7 that is closed in the circumferential direction of the cable set 2 of the grommet 1 thus acts concurrently as a foam-molding tool for the sealant 15.

FIG. 1 also suggests a first sealing element 16 at the open longitudinal end of the first guide channel segment 8 facing away from the flange 10 and a second sealing element 17 at the open longitudinal end of the guide channel segment 9 facing away from the flange 10. The sealing elements 16, 17 are made of a third plastic that differs from the first plastic of the shell elements 5, 6 and from the second plastic of the sealant 15. The third plastic is a thermoplastic elastomer (TPE) selected in keeping with the mechanical and chemical requirements in the environs of the chassis part 4 and/or the material compatibility with the first and second plastics. In this embodiment the sealing elements 16, 17 are strip-like and are dimensioned lengthwise so as to be wrapped circumferentially around the cable set 2, with an overlapping area. The sealing elements 16, 17 primarily serve to seal the guide channel 7 lengthwise in such a manner that the as yet uncured sealant 15 introduced into it cannot escape.

Furthermore, FIG. 1 illustrates that the shell elements 5, 6 are joined together by a latch connection formed by a plurality of molded-on latch elements 18 of the first shell element 5 and a plurality of molded-on mating latch elements 19 of the second shell element 6. The latch element 18 and the mating latch elements 19 are distributed along the guide channel segments 8, 9 and the flange sections 11, 12, with the result that the shell elements 5, 6 are joined together in the area of the guide channel 7 and of the flange 10 in a mechanically stable and largely fluid-tight manner. The latch elements 18 and the mating latch elements 19 interlock in the circumferential direction of the cable set 2 when the shell elements 5, 6 are joined together. No separate tool is required for the assembly of the shell elements 5, 6. Instead, the shell elements 5, 6 merely have to be placed onto the cable set 2 from the lateral direction and latched together.

Figure 2:
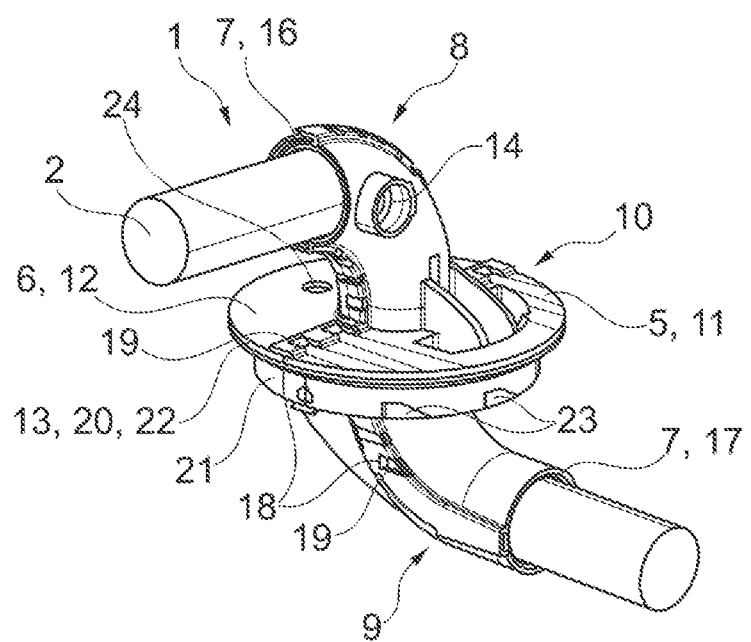
FIG. 2 shows a perspective view of a cable set with a grommet according to the invention.

In FIG. 2, showing a perspective view of the grommet 1, it can be seen that the flange 10 is stepped in the longitudinal direction of the cable set 2. Accordingly, the flange 10 has a section with a larger diameter 20 to abut the chassis part 4 and a section with a smaller diameter 21 to be guided through the component opening 3. The stepped design creates an abutting surface 22 facing the chassis part 4, so that first of all the aforementioned annular seal 13 is held in place by the section with a smaller diameter 21, and secondly it is pressed against the chassis part 4 by the abutting surface 22.

FIG. 2 also shows that the flange 10 has a bayonet-like fitting element formed by a plurality of flange-side engaging members 23. The engaging members 23 are molded on, they are distributed over the outer circumference of the section with a smaller diameter 21, and they project in the radial direction thereof. The engaging members 23 are geometrically dimensioned in such a manner that they may be brought into releasable engagement with engaging slits of the chassis part 4 by a turning motion of a few degrees of the flange 10 (not shown, not specifically designated).

Moreover, FIG. 2 reveals that the first guide channel segment 8 and the second guide channel segment 9 are bent around different bending axes that are perpendicular to one another. The open longitudinal ends of the shell elements 5, 6 are offset from one another in this embodiment by approximately 90°.

In FIG. 2, a through-bore 24 of the shell element 6 can be seen in the form of a refitting bore. The through-bore 24 extends from the section of the flange 10 with a larger diameter 20 along a portion of the guide channel 7 through the section with a smaller diameter 21, to permit one or more additional cables to be guided through the grommet 1, where applicable, adjacent to the guide channel 7 filled with sealant 15.

Figure 3:
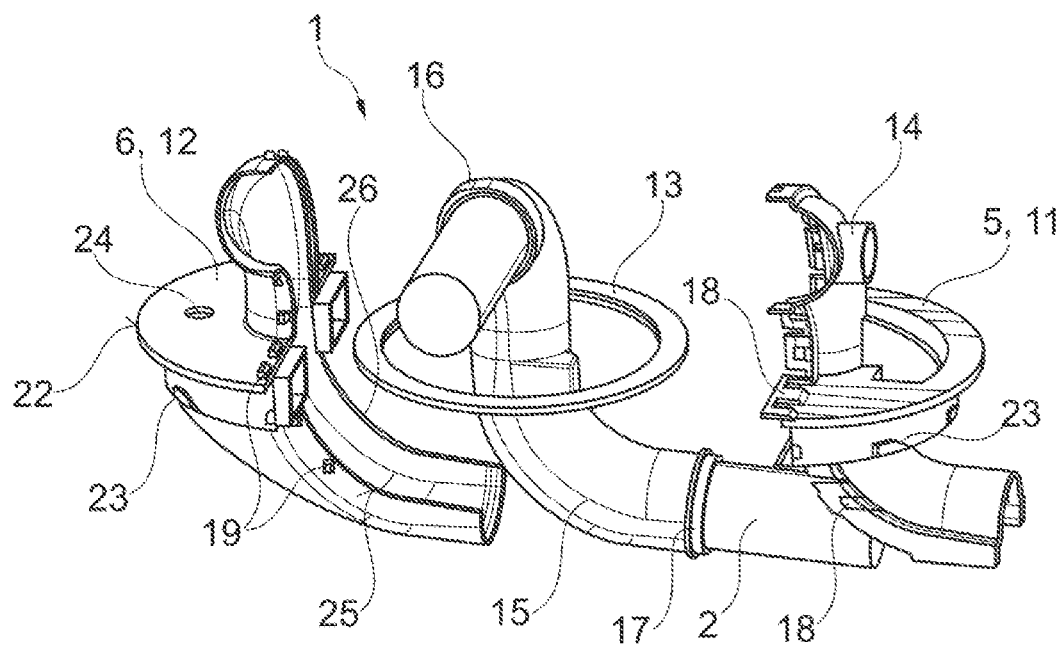
FIG. 3 shows an exploded view of a grommet according to the invention.

FIG. 3 shows an exploded view of the grommet 1. This view renders an especially good illustration of the foamed sealant 15 (already cured here). It will be appreciated that the sealant 15 is distributed prior to curing between the individual cables of the cable set 2 in order to seal it longitudinally. The foamed volume to be introduced into the guide channel 7 is predefined and limited by the geometric formation of the shell elements 5, 6 and the guide channel 7 formed by them. In addition, the latch elements 18 of the first shell element 5 and the mating latch elements 19 of the second shell element 6 are more easily recognizable in FIG. 3; they are adapted to be interlocked from the lateral direction of the cable set 2 when the shell elements 5, 6 are joined together. The latch elements 18 are designed as detent tabs that are formed integrally with the first shell element 5. The mating latch elements 19 are designed as detent lugs that are formed integrally with the second shell element 6. Furthermore, FIG. 3 shows that first joint edges 25 of the first shell element 5 and second joint edges 26 of the second shell element 6 run parallel to the cable set 2 guided in the guide channel 7. By this means the shell elements 5, 6 may be placed around the cable from the lateral direction.

Figure 4:
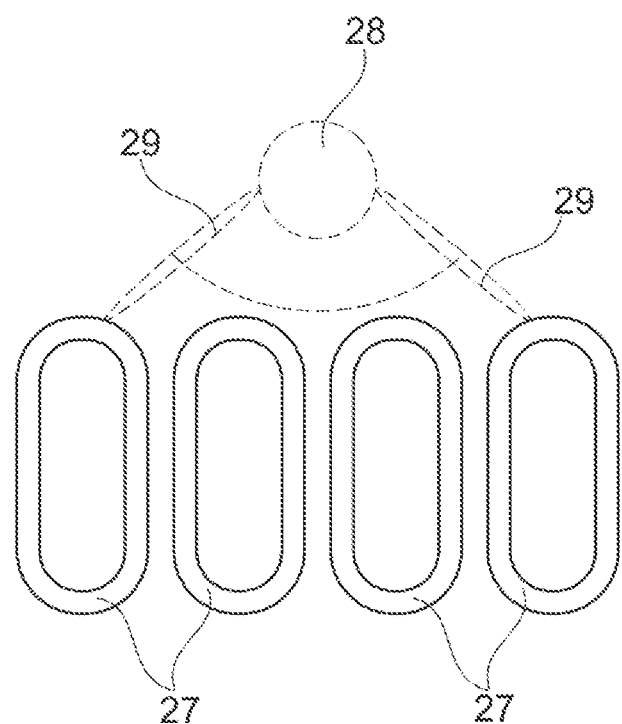
FIG. 4 shows a rough schematic arrangement of several construction boards for production of a cable set and a central foaming installation.

FIG. 4 shows a rough schematic view of an arrangement with several construction boards 27 for production of the cable set and with a central foaming installation 28 of a manufacturing site. A cable set 2 may be arranged and provided with the shell elements 5, 6 on each of the construction boards 27. A hose 29 of the foaming installation 28, suggested here by a dashed line, is designed to be guided to each of the construction boards 27 and connected to the respective filler pipes 14 of the grommet 1. For the best possible use of space within the production site, at least the hose 29 is situated above the construction boards 28 and can be pulled down and guided to the filler pipes 14.

Figure 5:
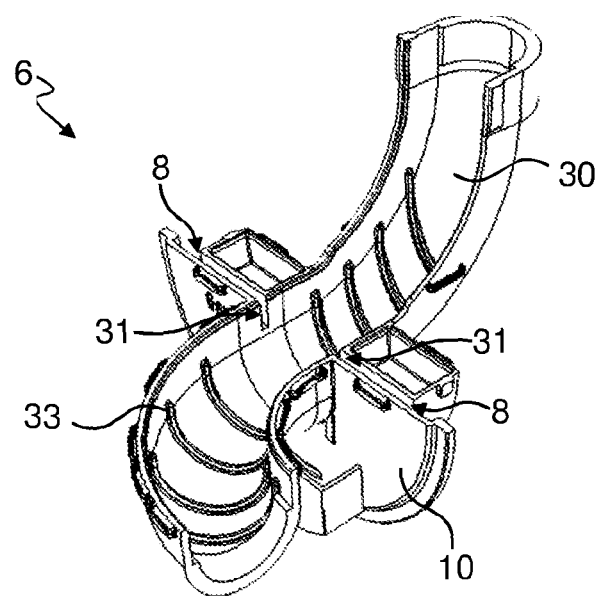
FIG. 5 shows a perspective view of the shell element with a runner channel as an individual part.

FIG. 5 shows another embodiment of the invention in which the shell elements 5, 6 have extending around the flange 10 a runner channel 30 that communicates fluidically with the guide channel 7. The fluidic connection is provided by a slit 31 formed in the side walls of the shell elements 5, 6. Thus, the runner channel 30 is supplied with sealant 15 through the guide channel 7, this being designed and formed in such a manner that the sealant 15 either supplements the annular seal 13 at least in sections or replaces it altogether. Thus, in the latter case the annular seal 13 may be eliminated, as the sealing in the area of the flange 10 is likewise carried out by the sealant 15, which in addition to providing a longitudinal seal against water in the interior of the grommet also provides the seal with regard to the chassis part 4.

Figure 6:
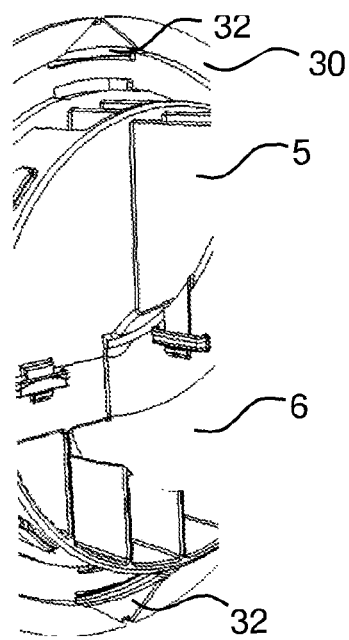
FIG. 6 shows a plan view of two joined shell elements with air vents.

FIG. 6 shows that formation of the annular seal 13 is even further improved if in addition to the runner channel 30 one or more air vents 32 are provided on each shell element 5, 6. It can be seen that the air vents 32 open from the runner channel 30 at the outer radial edge of the flange 10 into the grommet environs, in order to ensure that the runner channel 30 is completely filled with sealant 15. Thus, the runner channel 30 may be completely filled in that excess portions of the filled-in sealant 15 may exit section by section.

Figure 7:
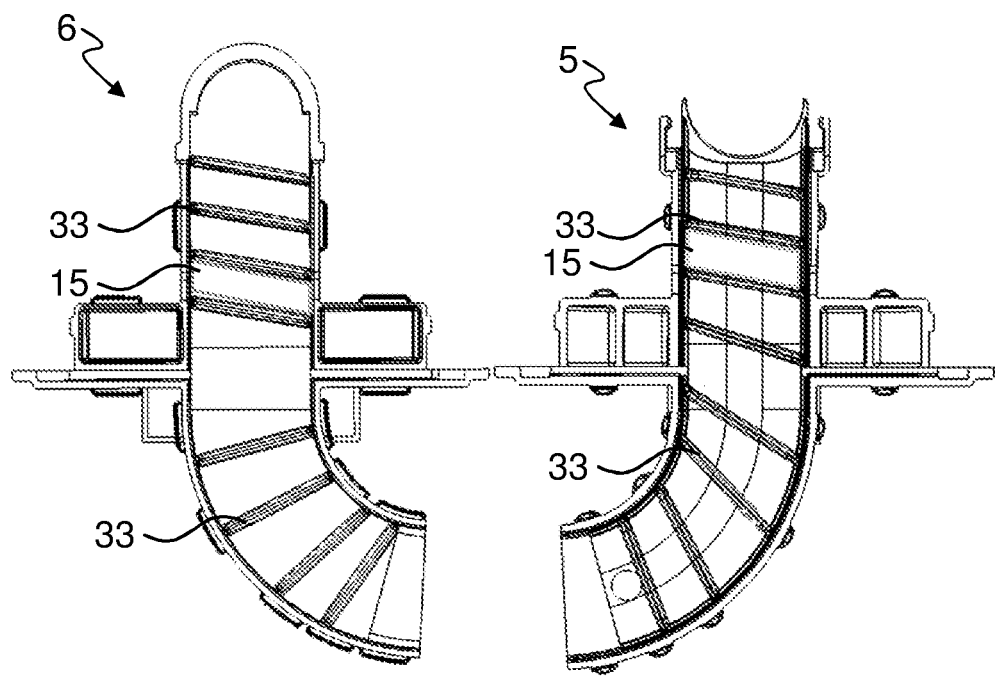
FIG. 7 shows a plan view of two complementary shell elements with ridges formed thereupon.

FIG. 7 shows an embodiment in which the shell elements 5, 6 each have ridges 33 protruding on an inner wall of the same. The ridges 33 are arranged to yield a spiral form when the shell elements 5, 6 are joined together. The ridges 33 perform a double function here; for one thing, they ensure that the cable set 2 does not directly abut the wall, and for another, they create a clear space in between for passage of the sealant 15, as indicated in FIG. 7. By this means, a continuous foam spiral of sealant 15 may be formed between the shell elements 5, 6 and the cable set 2.

Figure 8:
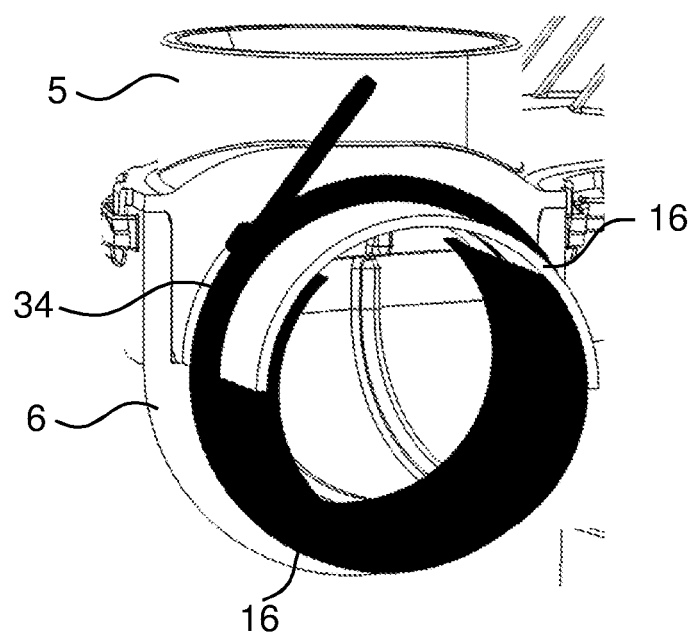
FIG. 8 shows a perspective view of a grommet with sealing elements arranged thereupon and bound together.

FIG. 8 shows an embodiment in which two sealing elements 16 and two sealing elements 17 are arranged respectively on each open longitudinal end of the guide channel segments 8, 9 facing away from the flange 10. Each of the two sealing elements 16 is shaped onto a shell element in such a way that they overlap in the circumferential direction of the guide channel segment 8 and extend beyond the open end thereof when the shell elements are joined together. The two sealing elements 17 are arranged on the other guide channel segment 9 in the same manner. The respective protruding parts of the sealing elements 16, 17 are bound together by a tie element 34 such as a cable binder, for example.

FIG. 1 also suggests a first sealing element 16 at the open longitudinal end of the first guide channel segment 8 facing away from the flange 10 and a second sealing element 17 at the open longitudinal end of the guide channel segment 9 facing away from the flange 10. The sealing elements 16, 17 are made of a third plastic that differs from the first plastic of the shell elements 5, 6 and from the second plastic of the sealant 15. The third plastic is a thermoplastic elastomer (TPE) selected in keeping with the mechanical and chemical requirements in the environs of the chassis part 4 and/or the material compatibility with the first and second plastics. In this embodiment the sealing elements 16, 17 are strip-like and are dimensioned lengthwise so as to be wrapped circumferentially around the cable set 2, with an overlapping area. The sealing elements 16, 17 primarily serve to seal the guide channel 7 lengthwise in such a manner that the as yet uncured sealant 15 introduced into it cannot escape.

The production of the grommet 1 can be described as follows.

First of all, the cable set 2 is produced and prepared on a construction board 27 that is known from the prior art. Then the shell elements 5, 6 are arranged from the side around the outer circumference of the cable set 2, placed onto the same and joined together by latching the latch elements 18 to the mating latch elements 19. Then the hose 29 of the foaming installation 28, which hose may be suspended above the construction boards 25, for example, is guided up to and attached to the filler pipe 14 of the shell element 5, for instance by swiveling or pulling. The sealant 15 is introduced into the guide channel 7 through the filler pipe 14 that opens into the guide channel 7, then it is distributed in the guide channel and cured over time, i.e. in a few minutes. The curing also causes the filler pipe 14, which was previously open to the outside, to be plugged up and sealed by the sealant 15. Since the shell elements 5, 6 are a permanent part of the grommet 1, they are further used and therefore left on the cable set 2. The shell elements 5, 6 are then attached to the component opening 3 during the mounting of the grommet 1.

Starting from the embodiment presented above, the grommet 1 and the method of its production can be modified in many ways.

For example, it is possible for the annular seal 13 to be formed integrally with the shell elements 5, 6 in a multi-component injection-molding process. For this the annular seal 13 is divided into two parts, with a first part being arranged on the first shell element 5 and a second part on the second shell element 6. However, it is also conceivable for the annular seal 13 to be formed by the sealant 15. To this end the shell elements 5, 6 have a plurality of exit ports for the defined exit of the sealant 15 from the guide channel 7. Ideally, the exit ports are arranged in a groove, furrow or depression that runs around the cable set 2 and is filled up little by little with the exiting sealant 15. As an alternative, it is possible to use a molding tool that is equipped to keep the exiting sealant 15 in shape on the shell elements 5, 6 as long as it takes for the sealant 15 to cure at least partially. For example, the molding tool may be designed as a type of tongs whose legs grasp the joined shell elements 5, 6, and which has a groove, furrow or depression to catch the sealant 15 exiting through the exit ports. After the curing, the tongs are then simply removed from the shell elements 5, 6.

LIST OF REFERENCE NUMBERS

1 grommet
2 cable set/cable(s)
3 component opening
4 chassis part
5 first shell element (e.g., half-shell)
6 second shell element (e.g., half-shell)
7 guide channel
8 first guide channel segment
9 second guide channel segment
10 flange
11 first flange section
12 second flange section
13 seal (e.g., annular seal)
14 filler pipe
15 sealant
16 first sealing element
17 second sealing element
18 latch element(s)
19 mating latch element(s)
20 section with larger diameter
21 section with smaller diameter
22 abutting surface
23 flange-side engaging element(s)
24 through-bore/refitting bore
25 first joint edge(s)
26 second joint edge(s)
27 construction board(s)
28 foaming installation
29 hose/nozzle
30 runner channel (s)
31 slit(s)
32 air vent(s)
33 ridge(s)
34 tie element(s) (e.g., cable binders)

The invention claimed is:

1. A grommet for guiding one or more cables through an opening in a component, comprising:
   a first shell element at least partly surrounding an outer circumference of the one or more cables and being made of a first form-stable plastic;
   a second shell element joined to the first shell element and at least partly surrounding the outer circumference of the one or more cables, the second shell element defining together with the first shell element a guide channel sealed in a circumferential direction of the one or more cables, to guide the one or more cables through the opening in the component;
   a sealant consisting of a foamed second plastic, the sealant being introduced into the guide channel via a filler spout molded to at least one of the first shell element and the second shell element and connected to the guide channel and the sealant longitudinally sealing the grommet against water; and
   wherein at least one of the first shell element and the second shell element has a through-bore extending adjacent to the guide channel and configured to permit the one or more cables to be guided subsequently through the component opening.

2. The grommet according to claim 1, wherein the first plastic is an injection-molded thermoplastic material.

3. The grommet according to claim 1, wherein the first and second shell elements are formed as half-shells.

4. The grommet according to claim 1, wherein the first and second shell elements are joined together such that joint edges of the first and second shell elements extend parallel to the one or more cables guided in the guide channel.

5. The grommet according to claim 1 one of the preceding claims, wherein the first shell element and the second shell element are joined together by a latch connection.

6. The grommet according to claim 5, wherein the latch connection is formed by a plurality of latch elements of the first shell element and a plurality of mating latch elements of the second shell element, the plurality of latch elements and the plurality of mating latch elements engaging with each other in the circumferential direction of the one or more cables.

7. The grommet according to claim 1, wherein every shell element has on an inner side a plurality of ridges protruding from an inner wall, the ridges complementing each other to form a spiral when the first and second shell elements are joined together.

8. The grommet according to claim 1, further comprising, on at least one longitudinal end of the joined first and second shell elements, two or more sealing elements overlapping in a circumferential direction of the guide channel and arranged to seal the guide channel against an escape of sealant, the sealing elements being held together by a tie element.

9. The grommet according to claim 8, the two or more sealing elements are is made of a third plastic differing from the first plastic.

10. The grommet according to claim 8, wherein the two or more sealing elements are made of a third plastic differing from the sealant.

11. The grommet according to claim 1, wherein at least one of the first or the second shell element has a molded-on flange to seal the component opening.

12. The grommet according to claim 11, wherein the flange has a runner channel extending in the circumferential direction, with a seal capable of being formed by the sealant via the runner channel.

13. The grommet according to claim 12, wherein the flange has at least one bayonet-like fitting element configured to attach to the component opening.

14. The grommet according to claim 1, wherein the second plastic comprises foamed polyurethane.

15. The grommet according to claim 1, wherein the sealant is selected to cure within two to five minutes.

16. A method for producing a grommet for guiding one or more cables through an opening in a component, the method comprising:
   readying the one or more cables for use;
      placing a first shell element and a second shell element to be joined together with the first shell element around an outer circumference of the one or more cables, the shell elements being made of a form-stable first plastic;
      introducing, via a filler spout molded to at least one of the first shell element and the second shell element and connected to a guide channel defined by the shell elements, a foamed sealant made of a second plastic into the guide channel defined by the shell elements and sealed in a circumferential direction of the one or more cables, to longitudinally seal the grommet formed by the first shell element and the second shell element against water; and
      wherein at least one of the first shell element and the second shell element has a through-bore extending adjacent to the guide channel and configured to permit the one or more cables to be guided subsequently through the component opening.

17. The method according to claim 16, wherein introducing the sealant further comprises introducing the sealant through a foaming installation, while the one or more cables are arranged on a construction.

18. The method according to claim 16, further comprising curing the sealant.

19. The method according to claim 18, wherein curing the sealant comprises curing the sealant for between two to five minutes.

* * * * *